Jan. 23, 1923.
J. P. FIRPO.
AUXILIARY VALVE ATTACHMENT FOR TIRE PUMPS.
FILED APR. 9, 1921.
1,442,933
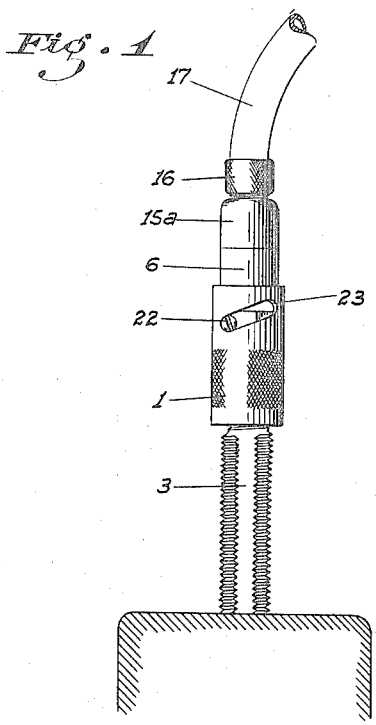
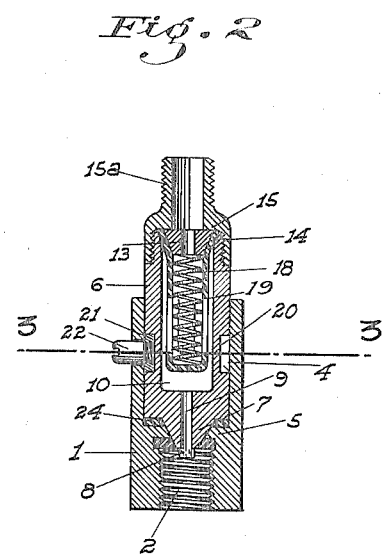
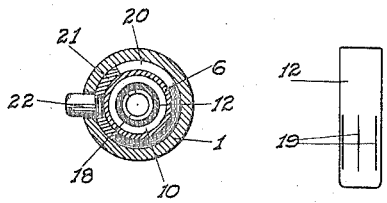
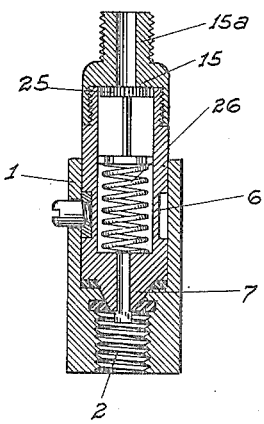
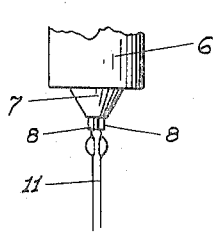
INVENTOR.
John P. Firpo
BY
ATTORNEY Patented Jan. 23, 1923.

1,442,933

UNITED STATES PATENT OFFICE.

JOHN P. FIRPO, OF STOCKTON, CALIFORNIA.

AUXILIARY VALVE ATTACHMENT FOR TIRE PUMPS.

Application filed April 9, 1921. Serial No. 459,917.

*To all whom it may concern:*

Be it known that I, JOHN P. FIRPO, a citizen of the United States, residing at Stockton, county of San Joaquin, State of California, have invented certain new and useful Improvements in Auxiliary Valve Attachments for Tire Pumps; and I do declare the following to be a full, clear, and exact description of the same, reference being had to the accompanying drawings, and to the characters of reference marked thereon, which form a part of this application.

This invention relates to improvements in attachments for tire pumps for facilitating the pumping of air into a pneumatic tire through the usual spring-valve thereof.

The principal object of my invention is to devise an auxiliary valve attachment adapted to be attached to the free end of the pump hose and to serve as a coupling between the same and the tire valve, and containing mechanism for holding down the stem of the valve while the tire is being pumped, while at the same time preventing the escape of air from the tire during the non-active or upstroke of the pump piston.

These valve stems are very small, and have but little surface on which the incoming air may act to force the valve open, so that when, as frequently occurs, the stem works hard and is inclined to stick closed, an undue strain is thrown on the pump hose, the air pressure formed being very often insufficient to open the valve, thus making the pumping up of the tire a hard and tedious job.

Another object of the invention is to so arrange the stem-holding mechanism that the device may first be coupled onto the valve before the stem is pressed down, and the stem released before uncoupling the device, so there will be no escape of air when placing or removing the attachment itself.

A further object of the invention is to produce a simple and inexpensive device and yet one which will be exceedingly effective for the purposes which it is designed.

These objects I accomplish by means of such structure and relative arrangement of parts as will fully appear by a perusal of the following specification and claims.

In the drawings similar characters of reference indicate corresponding parts in the several views.

Fig. 1 is a side elevation of the device, showing the same coupled to a valve and pump hose.

Fig. 2 is an enlarged and detached sectional elevation of the device.

Fig. 3 is a cross section on a line 3—3 of Fig. 2.

Fig. 4 is a detached view of an automatic one-way valve member.

Fig. 5 is a fragmentary view of the lower end of the stem-holding member.

Fig. 6 is a sectional elevation showing a modified form of interior valve mechanism.

Referring now more particularly to the characters of reference on the drawings, the numeral 1 denotes a tubular shell, tapped at its lower end as at 2 to screw onto a valve 3.

Above the tapped portion the shell is bored plain as at 4, there being a shoulder or seat 5 between the tapped and plain portions.

Turnably mounted in the bore 4 of the shell is a tubular member 6 provided at its lower end with a tapered head 7, which is adapted to project through the seat portion 5 of the shell 1. The lower end of the head is provided with a pair of spaced lugs 8, there being an orifice 9 leading from between said lugs to the larger and normal bore 10 of the member 6. The space between the lugs 8 is less than the diameter of the valve stem 11 so that the latter may rest against the outer ends of the lugs, but cannot pass therebetween to stop up the air passageway provided.

A rubber nipple or tube 12, closed on its lower end is mounted in the bore 10, and is held therein in spaced relation from the walls thereof by means of a tapered washer 13, which fits inside the upper end of the tube and is clamped against a tapered seat 14 at the upper end of the bore 10, so as to make an air tight joint therebetween, by means of a shoulder 15 on a cap 15ª secured onto the upper end of the member 6, the upper end of the cap being either threaded to screw into the pipe coupling 16 of the hose or being designed so as to allow the hose 17 to be directly connected and permanently mounted thereon.

On the inside of the tube 12 is fitted a spring 18 to prevent collapse of the tube, the latter being provided with a plurality of longitudinal cuts or slits 19, normally closed.

Below the outer end of the shell the member 6 is provided with a circumferential groove 20 in which rides a ring-segment 21 to which is radially secured a pin 22 projecting through and guided by a circumferential but diagonally positioned slot 23 in the shell, the pin projecting therebeyond a sufficient distance to enable it to be moved by the fingers. The length and angular setting of this slot is sufficient to move the member 6 lengthwise of the shell so that the head 7 will clear the valve and stem entirely, or will bear against and depress the stem 11, the member 6 then seating against the shoulder 5, there being preferably a flexible gasket 24 therebetween.

By reason of the ring 21, the latter is the only member which turns when the pin is moved lengthwise of the slot, the member 6 having a direct inward or outward movement in the shell. Thus no twisting of the hose or of the valve stem or gasket is had, which of course insures better operation and a longer life to the parts involved.

In the modified form shown in Fig. 6, the tube 12 is replaced by a solid gasket or disk 25 which is normally held against the shoulder of the cap 15ª by means of a spring 26 in the member 6.

To operate the device, the shell 1 is screwed onto the valve, the member 6 remaining relatively stationary owing to the fact that it is not connected to turn with said shell. When doing this, the inner member 6 is positioned so that the head 7 is away from the valve stem, or in other words, the pin 22 is at the outer end of the slot 23. The position of the pin may then be reversed so that the member 6 is moved inwardly of the shell and the head 7 depresses the stem 11, opening the passageway through the valve 3. The pump may then be operated, which forces air into the tube 12, this causing the edges of the same at the slits 19 to move apart outwardly and allow the air to pass therethrough into the valve.

At the same time the air cannot back up from the valve, since the rigid member in the tube 12 prevents the air from opening the slits inwardly, and the latter remain closed.

Before removing the attachment when the desired air pressure has been attained, the pin 22 is again removed to cause the valve stem to be released, and the shell is then uncoupled from the valve.

The foregoing operations, particularly regarding the valve member 12, pertains to the type detailed in Figs. 2, 3 and 4. The operation for the style shown in Fig. 6 is the same, except that the valve 25, whose operation is self evident, takes the place of the member 12 and its connected parts.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:—

1. An auxiliary valve attachment for tire pumps including a shell adapted at one end for connection to a tire valve, a tubular member mounted in the shell for longitudinal movement therein, and means mounted on the inner end of the tubular member for depressing the valve stem when said member is moved and without movement of the shell, and for then allowing air to enter the tire while preventing its escape therefrom.

2. An auxiliary valve attachment for tire pumps comprising a shell adapted at one end for connection to a tire valve, a tubular member mounted in the shell for relative longitudinal movement therein and adapted at its outer end for connection to a pump, an orificed head on the inner end of the tubular member adapted to bear against and depress the valve stem or to move clear of the same, means for so moving said tubular member at will, and means whereby when said stem is depressed by said head the air in the tire cannot flow back to the pump.

3. An auxiliary valve attachment for tire pumps comprising a shell adapted at one end for connection to a tire valve, a tubular member mounted in the shell for relative longitudinal movement therein and adapted at its outer end for connection to a pump, means on the inner end of the tubular member adapted to bear against and depress the valve stem or to move clear of the same, means for so moving said tubular member at will, and an automatic valve in said tubular member arranged to open only in a direction away from the pump.

4. An auxiliary valve attachment for tire pumps comprising a shell adapted at one end for connection to a tire valve, a tubular member mounted in the shell for turnable and relative longitudinal movement therein and adapted at its outer end for connection to a pump, means on the inner end of the tubular member adapted to bear against and depress the valve stem or to move clear of the same, a circumferential groove cut in the outer face of the tubular member inside the shell, a ring-segment freely mounted in said ring, and a radial pin fixed to and projecting outwardly of the ring, the shell being provided with a circumferential and diagonally positioned slot through which the pin projects to guide the same and limit its possible movement.

In testimony whereof I affix my signature.

JOHN P. FIRPO.